United States Patent
Kumar et al.

(10) Patent No.: US 12,513,510 B2
(45) Date of Patent: Dec. 30, 2025

(54) SYSTEMS AND METHODS FOR UE POLICY UPDATE MANAGEMENT

(71) Applicant: Samsung Electronics Co., Ltd., Suwon-si (KR)

(72) Inventors: Suman Kumar, Bangalore (IN); Rajesh Challa, Bangalore (IN); Naveen Kumar Srinivasa Naidu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 315 days.

(21) Appl. No.: 18/336,162

(22) Filed: Jun. 16, 2023

(65) Prior Publication Data

US 2024/0171969 A1 May 23, 2024

Related U.S. Application Data

(63) Continuation of application No. PCT/KR2023/008086, filed on Jun. 13, 2023.

(30) Foreign Application Priority Data

Nov. 23, 2022 (IN) .............................. 202241067367

(51) Int. Cl.
*H04W 8/24* (2009.01)
(52) U.S. Cl.
CPC .................................. *H04W 8/245* (2013.01)
(58) Field of Classification Search
CPC ................................................... H04W 8/245
See application file for complete search history.

(56) References Cited

U.S. PATENT DOCUMENTS

| 10,524,198 | B2 | 12/2019 | Shan et al. |
| 11,647,124 | B2 | 5/2023 | Sun et al. |
| 11,700,549 | B2 | 7/2023 | Qiao et al. |
| 11,849,331 | B2 | 12/2023 | Lee et al. |

(Continued)

FOREIGN PATENT DOCUMENTS

| WO | 2021/046803 | 3/2021 |
| WO | 2021/091186 | 5/2021 |
| WO | 2022/062797 | 3/2022 |

OTHER PUBLICATIONS

3rd Generation Partnership Project, 3GPP TS 23.502, Procedures for the 5G System (5GS); Stage 2 (Release 18), Technical Specification Group Services and System Aspects, Apr. 2023, V18.1.1, 829 pages.

(Continued)

*Primary Examiner* — Michael Thier
(74) *Attorney, Agent, or Firm* — NIXON & VANDERHYE P.C.

(57) ABSTRACT

Embodiments disclosed herein relate to a method performed by an access and mobility management function (AMF), comprises transmitting, to a policy control function (PCF), a request for updating a user equipment (UE) policy transmitted from a UE. The method comprises receiving, from the PCF, a message bundled a plurality of logical UE policies based on the UE policy. The method comprises generating a plurality of N1 requests based on the message. The method comprises transmitting, to the UE, the plurality of N1 requests to delivery of the UE policy.

19 Claims, 7 Drawing Sheets

(56) References Cited

U.S. PATENT DOCUMENTS

| | | | |
|---|---|---|---|
| 2019/0268835 A1* | 8/2019 | Shan | H04W 48/16 |
| 2020/0107182 A1* | 4/2020 | Chen | H04W 48/12 |
| 2020/0412559 A1* | 12/2020 | Tang | H04L 47/824 |
| 2021/0029253 A1 | 1/2021 | Xu | |
| 2021/0067949 A1 | 3/2021 | Xu et al. | |
| 2021/0075631 A1* | 3/2021 | Liao | H04M 15/8038 |
| 2021/0160186 A1* | 5/2021 | Xu | H04W 48/14 |
| 2022/0124521 A1* | 4/2022 | Xu | H04W 28/09 |
| 2022/0167299 A1* | 5/2022 | Xu | H04W 60/04 |
| 2022/0191052 A1* | 6/2022 | Garcia Azorero | H04L 12/1407 |
| 2022/0312297 A1 | 9/2022 | Cakulev et al. | |
| 2022/0377529 A1 | 11/2022 | Kim et al. | |
| 2023/0007611 A1* | 1/2023 | Karampatsis | H04W 60/005 |
| 2023/0135699 A1* | 5/2023 | Liao | H04W 4/50 |
| | | | 370/252 |
| 2023/0319681 A1* | 10/2023 | Kiss | H04W 40/36 |
| 2023/0337267 A1 | 10/2023 | Liu et al. | |
| 2024/0171969 A1* | 5/2024 | Kumar | H04W 8/245 |
| 2024/0414592 A1* | 12/2024 | Xu | H04W 28/0925 |
| 2025/0081081 A1* | 3/2025 | Shan | H04W 76/12 |

OTHER PUBLICATIONS

3rd Generation Partnership Project, 3GPP TS 24.301, Non-Access-Stratum (NAS) protocol for Evolved Packet System (EPS); Stage 3 (Release 18), Technical Specification Group Core Network and Terminals,, Mar. 2023, V18.21., 622 pages.

Search Report and Written Opinion dated Oct. 16, 2023 issued in International Patent Application No. PCT/KR2023/008086.

3GPP TSG-CT3, "Correction to ANDSP/URSP rules Determination", Meeting Notes, Meeting #123e, Aug. 18-26, 2022, 12 pages.

* cited by examiner

SYSTEMS AND METHODS FOR UE POLICY UPDATE MANAGEMENT

CROSS-REFERENCE TO RELATED APPLICATIONS

This application is a continuation of International Application No. PCT/KR2023/008086, designating the United States, filed on Jun. 13, 2023, in the Korean Intellectual Property Receiving Office and claiming priority to Indian Patent Application No. 202241067367, filed on Nov. 23, 2022, in the Indian Patent Office, the disclosures of which are incorporated by reference herein in their entireties.

BACKGROUND

Field

The disclosure relates to wireless communication networks, and for example, to transmit multiple logical user equipment (UE) policies to the UE in wireless communication networks, via an access and mobility management function (AMF) within specified limits, over a plurality of access channels to achieve parallelization.

Description of Related Art

Typically, a UE configuration update procedure includes the UE obtaining a UE policy from a PCF network element. The UE policy can be used to perform a wireless local area network (WLAN) selection, a UE access selection and a protocol data unit (PDU) session selection in the UE configuration. The UE may utilize different UE policies for different scenarios. When the UE policy is transmitted to the UE, the UE policy can be divided into one or more sections by the network for transmission, wherein each section can be identified by a policy section identifier.

For example, during a UE policy update procedure, if the policy size is greater than the predefined size (Packet Data Convergence Protocol (PDCP) layer limit, Next Generation Radio Access Network (NG-RAN)), then the PCF splits the policy into multiple logical policies. The PCF sends multiple requests to the AMF to deliver the policies to the UE, which is connected over multiple access channels such as 3GPP and non-3GPP. This leads to multiple requests from the PCF to the AMF and problem arises for the selection of access type as which access type of the UE should be selected by the AMF to deliver the policies.

SUMMARY

Embodiments of the disclosure provide systems and methods for transmitting, by a network, one policy message with HTTP multipart content type logical broken UE policies within predefined (e.g., specified) limit(s) to the AMF.

Embodiments of the disclosure provide systems and methods for breaking, by the AMF, the policy message from the PCF into multiple messages and steering the messages over a plurality of access channels to the UE to achieve parallelization.

Embodiments of the disclosure provide systems and methods for receiving, by the network, a single failure message instead of multiple failure messages in case of a message delivery error to the UE due to unreachability of the UE.

Embodiments of the disclosure provide systems and methods for providing priority access definition for control messages where the AMF can be configured to have priority indication to use a specific access type to deliver messages such as load-balanced, weighted round-robin, cost-vs-performance balanced, default, and so on.

Embodiments of the disclosure provide systems and methods for transmitting multiple logical user equipment (UE) policies to a UE via an access and mobility management function (AMF) within a predefined (e.g., specified) limit.

According to various example embodiments a method for managing UE policy update by a network is provided. The method comprises receiving, by the network, a request for updating the UE policy from the UE. The method includes verifying, by the network a size of the UE policy information. The method includes splitting, by the network, the UE policy information into a plurality of logical UE policies, on the size of the UE policy information exceeding by a specified limit. The method includes sending, by the network, the plurality of logical UE policies in a plurality of policy update messages over a plurality of access channels to the UE parallelly.

According to various example embodiments, a network is provided and is configured to: receive a request for updating the UE policy from the UE, verify a size of the UE policy information, split the UE policy information into a plurality of logical UE policies on the size of the UE policy information exceeding by a specified limit, and send the plurality of logical UE policies in a plurality of policy update messages over a plurality of access channels to the UE parallelly.

According to various example embodiments, a method for managing UE policy update by the UE is provided. The UE is configured to send a request for updating the UE policy to a network. The UE is further configured to receive a plurality of logical UE policies in a plurality of policy update messages over a plurality of access channels, on the size of the UE policy information exceeding by a specified limit.

According to various example embodiments, a method for managing UE policy update by a Policy Control Function (PCF) is provided. The method includes receiving, by the PCF, a request for updating the UE policy from the UE via the AMF. The method includes verifying, by the PCF, a size of the UE policy information. The method includes splitting, by the PCF, the UE policy information into a plurality of logical UE policies, on the size of the UE policy information exceeding by a specified limit. The method includes bundling, by the PCF, the plurality of logical UE policies in a message using a hyperText transfer protocol (HTTP) multipart content type payload. The method includes sending, by the PCF, the message to the AMF.

According to various example embodiments, a method performed by an access and mobility management function (AMF), comprises transmitting, to a policy control function (PCF), a request for updating a user equipment (UE) policy transmitted from a UE. The method comprises receiving, from the PCF, a message bundled a plurality of logical UE policies based on the UE policy. The method comprises generating a plurality of N1 requests based on the message. The method comprises transmitting, to the UE, the plurality of N1 requests to delivery of the UE policy.

According to various example embodiments, a method performed by a policy control function (PCF), comprises receiving, from an access and mobility function (AMF), a request for updating a user equipment (UE) policy transmitted from a UE. The method comprises transmitting, to the PCF, a message bundled a plurality of logical UE policies based on the UE policy. A plurality of N1 requests are generated based on the message. The plurality of N1 requests are transmitted to the UE to delivery of the UE policy.

According to various example embodiments, a method performed by a user equipment (UE), comprises transmitting, to an access and mobility management function (AMF), a request for updating a user equipment (UE) policy. The request is forwarded from the AMF to a policy control function (PCF). The method comprises receiving, from the AMF, a plurality of N1 requests to delivery of the UE policy. The plurality of N1 requests are generated based on a message. The message is bundled from a plurality of logical UE policies based on the UE policy.

These and other aspects of the various example embodiments herein will be better appreciated and understood when considered in conjunction with the following detailed description and the accompanying drawings. It should be understood, however, that the following descriptions, while indicating various example embodiments and various specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

Embodiments herein are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Various example embodiments herein and the various features and advantageous details thereof are explained more fully with reference to the following non-limiting example embodiments that are illustrated in the accompanying drawings and detailed in the following description. Descriptions of well-known components and processing techniques may be omitted so as to not unnecessarily obscure the disclosure with unnecessary detail. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
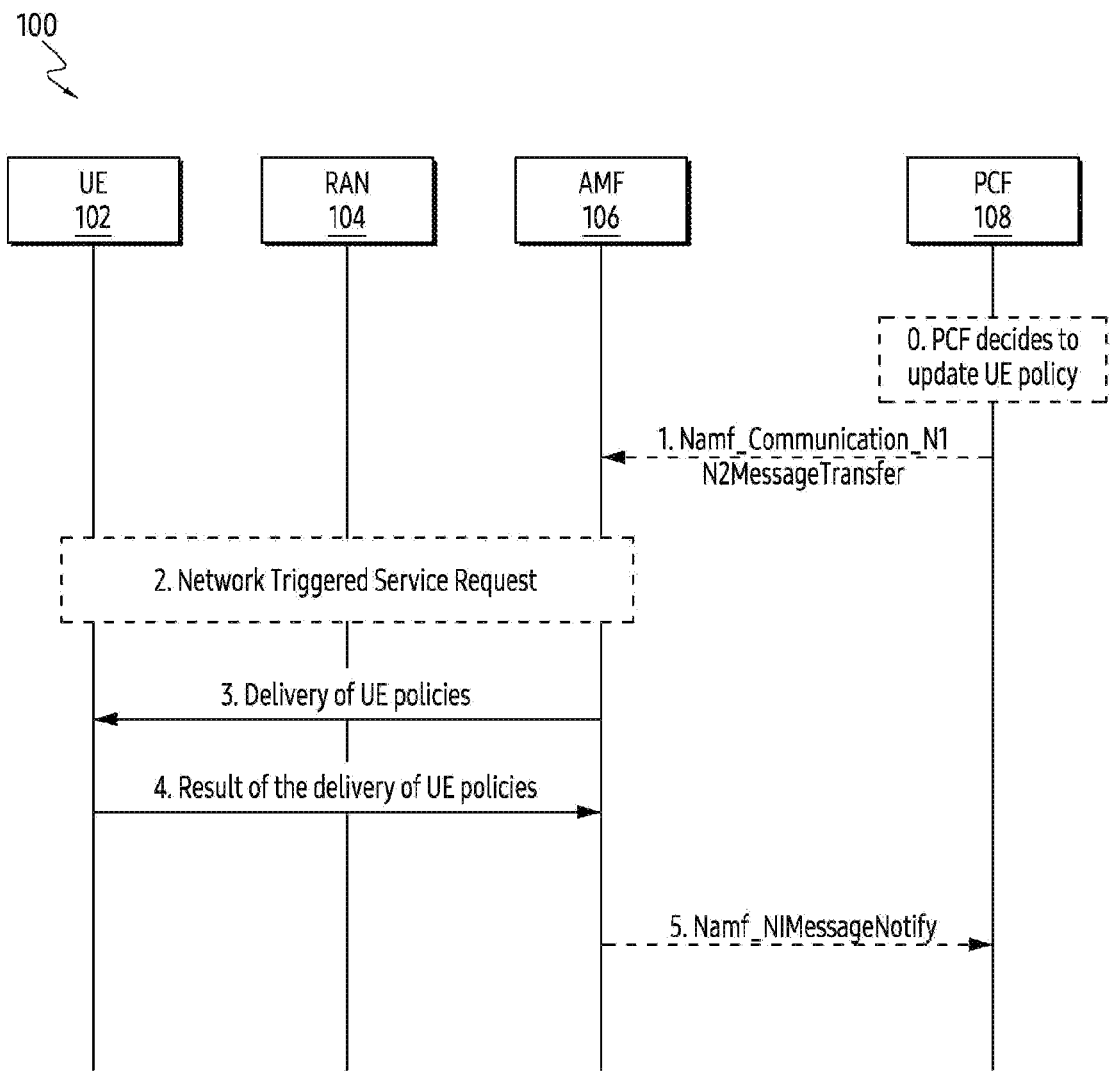
FIG. 1 is a signal flow diagram illustrating an existing UE configuration update procedure, according to the prior art.

FIG. 1 is a signal flow diagram illustrating an existing UE configuration update procedure 100. The UE configuration update procedure 100 comprises a UE 102, a radio access network (RAN) 104, an AMF 106, and a PCF 108. The procedure 100 is initiated at step 0, when the PCF 108 decides to update the UE policy procedure based on triggering conditions such as, but not limited to, an initial registration, registration with 5G system (5GS) when the UE 102 moves from evolved packet system (EPS) to 5GS, or need for updating UE policy. The PCF 108 may decide to update the UE 102 access selection and PDU session selection related policy information (e.g., UE policy) in the UE 102 configuration.

At step 1, the PCF 108 checks if the size of the policy information related to the UE 102 access selection and PDU session selection exceeds a predefined limit. If the size exceeds the predefined limit, the PCF 108 splits the UE access selection and PDU session selection related policy information in sections; a first section is smaller, logically independent UE access selection and a second section is PDU session selection related policy information; hereby ensuring the size of each is under the predefined limit. Each section can be sent in separate service operations through a message depicted as Namf_Communication_N1N2MessageTransfer.

The NAS messages from the AMF 106 to UE 102 does not exceed the maximum size limit allowed in NG-RAN (PDCP layer), so the predefined size limit in PCF 108 is related to that limitation. Multiple messages are sent from the PCF 108 to the AMF 106, where HTTP does enforce the limit as it is enforced due to the RAN limit. Therefore, if failure arises, multiple failure messages may flow between the AMF 106 and the PCF 108.

At step 2, in the network triggered service request, when the UE 102 has registered and reachable by the AMF 106 in either 3GPP access or non-3GPP access, the AMF 106 provides registered and reachable access. At step 3, if the UE 102 is in CM-CONNECTED over 3GPP access or non-3GPP access, the AMF 106 transparently transfers the UE Policy container (UE 102 access selection and PDU Session selection related policy information) received from the PCF 108 to the UE 102. However, no priority for the selection of access type is defined for control messages to deliver multiple broken policies. At step 4, the result of the delivery of UE policies are sent to the AMF 106 from the UE 102. For example, the UE 102 updates the UE policy provided by the PCB 108 and sends the result to the AMF 106. At step 5, N1 message notifications are sent from the AMF 106 to the PCF 108 indicating the UE policy updating by the UE 102. The N1 message notification is referenced as Namf_Communication_N1MessageNotify.

The embodiments herein transmit logically separated HyperText Transfer Protocol (HTTP) multipart content of User Equipment (UE) policies by an Access and Mobility Management Function (AMF) over a plurality of access channels to achieve parallelization. The HTTP multipart content type with logical broken policy can be transmitted from a policy control function (PCF) to the AMF in a single message within a predefined limit. Referring now to the drawings, and more particularly to FIGS. 2 through 6, where similar reference characters denote corresponding features consistently throughout the figures, there are shown various example embodiments.

Figure 2:
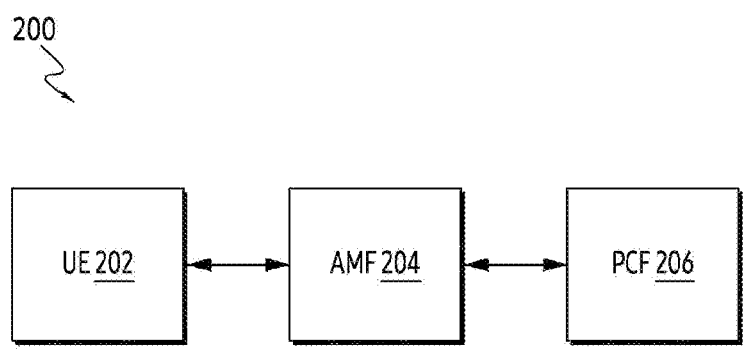
FIG. 2 is a block diagram illustrating an example configuration of a network for managing UE policy update, according to various embodiments.

FIG. 2 is a block diagram illustrating an example configuration of a network 200 for managing UE policy update(s) according to various embodiments. In an embodiment, the network 200 is configured to receive a request for updating the UE policy from a UE 202. The network 200 verifies a size of the UE policy information, on receiving the request. The size of the UE policy information is verified using the existing (3GPP 24.501) MANAGE UE POLICY COMMAND MESSAGE, or by appending multiple procedure transaction identities (PTI) and its corresponding format and length information elements (IE).

If the size of the UE policy information exceeds a predefined limit, the network 200 splits the UE policy information into a plurality of logical UE policies based on configuration rules and a split priority. The predefined limit is verified by adding new PTIs in the MANAGE UE POLICY COMMAND MESSAGE and providing information in optional IEs—format and length. The configuration rules can be governed either by the UE 202 or the network. Thereafter, the network 200 sends the plurality of logical UE policies in a plurality of policy update messages over a plurality of access channels to the UE 202 parallelly.

In an embodiment, the network 200 comprises at least one UE 202, an access and mobility management function (AMF) 204, and a policy control function (PCF) 206. The UE 202 can be configured to send a request to the network 200 for updating the UE policy. The UE policy update procedure can be initiated when the UE 202 has no policy configured, or the currently configured policies are no longer applicable.

The UE policy may comprise a policy identifier and a policy content. The policy identifier may comprise a Public Land Mobile Network (PLMN) identifier, a policy section code (PSC), and so on. The network can be a core AMF 204. The UE 202 may send the update request to the AMF 204 through an uplink (UL) NAS transport message. The AMF 204 can then transmit the update request to the PCF 206.

When the UE 202 performs the process of applying for the UE policy, the UE 202 may carry the policy identifier list stored by itself in the NAS message which is sent to the network. The network side further knows which policies the UE 202 has stored, and accordingly to update. By default, network assumes that whatever UE policies network sends to the UE 202, would be stored. The 3GPP 24.501 D.6.2 UE policy section management list subsection lists the actions, the UE 202 has to take once it receives the UE policy. An optional IE can be added by the PCF 206 to let the UE 202 communicate in case the UE 202 is not storing any particular subpart of the policy.

The UE policy may comprise at least one of an access network discovery and selection policy (ANDSP), a WLAN selection policy (WLANSP) or a UE route selection policy (URSP). For example, the WLANSP includes multiple rules, and the rules are used, when the UE 202 selects the WLAN access point. The URSP contains multiple rules which comprise of a traffic descriptor and a set of route selection description composition.

In an embodiment, the UE 202 can be configured to receive a plurality of logical UE policies in a plurality of policy update messages from the AMF 204 over the plurality of access channels. The UE 202 receives the logical UE policies over the plurality of access channels, when a size of the UE policy information has exceeded the predefined limit. For example, more than one PTI is added or UE/Operator's H-PCF configured predetermined limit value (<65535). Thus, the configuration of the UE policy is implemented through the UE configuration update process.

The UE 202 can be any device such as a smartphone, a handheld touchscreen mobile computing device, a tablet, a personal data assistant (PDA), a wearable device, a computer, wireless handset, or any device which may include at least one wireless communications interface.

In an embodiment, the UE 202 may comprise a processor (e.g., including processing circuitry) which may execute a computer program from a memory to implement the disclosed system 200. The memory can be configured as a separate device independent of the processor, or may be integrated in the processor.

Examples of the processor can be, but not limited to, at least one of a single processer, a plurality of processors, multiple homogeneous or heterogeneous cores, multiple Central Processing Units (CPUs) of different kinds, microcontrollers, special media, and other accelerators. The processor may be a general purpose processor, such as an application processor (AP), or the like, a graphics-only processing unit such as a graphics processing unit (GPU), a visual processing unit (VPU), and/or an Artificial Intelligence (AI)-dedicated processor such as a neural processing unit (NPU).

Examples of the memory can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory may also include one or more computer-readable storage media. The memory may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to refer to the memory being non-movable. In certain examples, a non-transitory storage medium may store data that can, over time, change (e.g., in Random Access Memory (RAM) or cache).

In an embodiment, the PCF 206 can be configured to receive the update request from the UE 202 via the AMF 204 and verify a size of the UE policy information. If the size of the UE policy information is exceeded by the predefined (e.g., specified) limit, then the PCF 206 splits the UE policy information into a plurality of logical UE policies. The PCF 206 verifies the request from the UE 202 for splitting the UE policy information, depending on configuration rules and a split priority. A UE 202 can indicate its interest about how much percentage of information the user wants to receive on 3GPP and non-3GPP accesses. The possible priority modes may include—3GPP Only, non-3GPP Only, Load Balanced, Custom—where percentage breakup can be mentioned between 3GPP/Non-3GPP. Further, the configuration rules can be governed either by the UE 202 or the network.

The PCF 206 may decide to send the UE policy based on the received update request.

In an embodiment, the PCF 206 can be configured to bundle the plurality of logical UE policies into a single HTTP message using a hyperText transfer protocol (HTTP) multipart content type payload. The HTTP header multiple content type values can be used to pack the logical UE policies in a single message. The HTTP header can use multipart/mixed-replace or multipart/parallel or multipart/attachment to pack the logical UE policies. Further, a new custom header value corresponding to the multipart/multiple-policies can be used. For instance, individual PTI can be translated into multipart content-type. Further, the PCF 206 bundles the multiple policies as multiple content part of HTTP payload and sends one Namf_Communication_N1N2MessageTransfer service operation to the AMF 204 to deliver the UE policy.

For example, the content-type can have any appropriate or suitable header value such as multipart/mixed or multipart/parallel or can have a new value such as multipart/x-multi-policies. The multipart Multipurpose Internet Mail Extensions (MIME) data can be sent in a HTTP post, as given below.

```
:method          : POST
:scheme          : http
:path            : /xxx-ue-policy-control/....
:content-length  : ######
:content-type    : multipart/mixed or multipart/parallel;
                   Charset="utf-8"; boundary="abcdefg..."
:MIME-version    : 1.0
:headers         : {
  :"multipart" [
    {
      "headers"                : {
        "Content-type"         : "application/json"
      },
      "Body"                   : {
        "path"                 : "xxxyyy..."
      }
    },
    {
      "headers"    :           {
        "Content-type"         : "multipart/x-multiple-policies"
      },
      "Body"                   : {
        "path"                 : "xxxyyy..."
      }
    },
  ]
```

The message containing the logical UE policies can be sent to the AMF 204 by the PCF 206. Thus, the PCF 206 can receive a single failure message from the AMF 204 instead of multiple failure messages in case of a message delivery failure to the UE 202 due to unreachability of the UE.

In an embodiment, the AMF 204 can be configured to split the UE policy information into a plurality of logical UE policies, on the size of the UE policy information exceeding the predefined limit. The AMF 204 verifies the request from the UE 202 for splitting the UE policy information, depending on configuration rules and a split priority. Further, the configuration rules can be governed either by the UE 202 or the service or the network.

In an embodiment, the AMF 204 can be configured to receive the message with logical UE policies from the PCF 206 and break the plurality of logical UE policies based on different PTIs, into a plurality of policy update messages. The policy update messages containing the UE policies can be transmitted from the AMF 204 to the UE 202. The AMF 204 steers the control messages to the UE 202 over the plurality of access channels such as 3GPP and non-3GPP to achieve parallelization. The network can decide on the selection of appropriate access channel based on network and UE attributes which include, but not limited to overall network congestion, learning based resource utilization prediction model, UE's priorities like smaller delay, lower cost, and balance.

In an embodiment, the AMF 204 can be configured with a Priority Access Definition (PAD) for control messages to have a priority indication. The possible priority modes may include—3GPP Only, non-3GPP Only, Load Balanced, Custom—where the percentage breakup can be mentioned between 3GPP/non-3GPP. Further, the configuration rules can be governed either by the UE 202 or the network to use a specific access channel to deliver the policy update messages containing the UE policies. The HTTP header value can be extended to reveal the priority details. The HTTP Header—Content-Type values pack multiple logical policies in one HTTP message using multipart/x-mixed-replace or multipart/parallel or multipart/attachment, otherwise, can create new custom one multipart/x-multiple-policies. Thus, the AMF 204 can be configured to have a priority indication to decide on which access channel can be used to deliver the policy update messages such as load-balanced, weighted round-robin, cost-vs-performance balanced, default, and so on. Thus, analytics which include AI/machine learning (ML) models based on supervised, unsupervised or reinforcement learning can be used to decide which particular access may be more appropriate temporally (and other dimensions too) and in what ratio the signaling information can be sent to the UE 202.

Thus, the UE policies can be transmitted from the PCF 206 to the UE 202 via the AMF 204. The UE 202 may parse the HTTP header value to determine that the UE policies are shared in multipart. For example, a terminal device may acquire a UE policy from the PCF 206 network element to perform WLAN selection or UE routing according to the UE policy. The UE 202 can simultaneously receive multiple UE policies. The use of HTTP multipart approach to send UE policies to the UE 202 saves processing time.

FIG. 2 shows example elements of the network 200, but it is to be understood that the embodiments are not limited thereon. In various embodiments, the network 200 may include less or a greater number of elements/units. Further, the labels or names of the units are used only for illustrative purpose and does not limit the scope of the embodiments herein. One or more units can be combined together to perform same or substantially similar function in the network 200.

Figure 3:
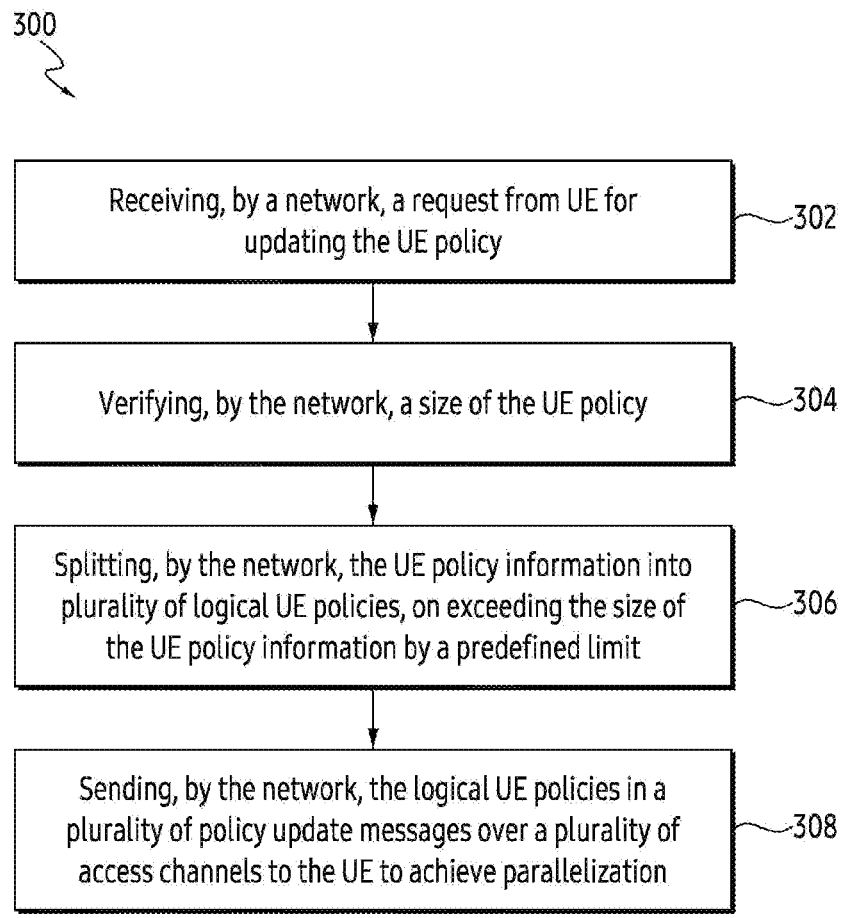
FIG. 3 is a flowchart illustrating an example method for managing UE policy update by the network, according to various embodiments.

FIG. 3 is a flowchart illustrating an example method 300 for managing UE policy update by the network according to various embodiments. The method 300 includes receiving, by the network, a request for updating the UE policy from the UE, as depicted in step 302. The method 300 includes verifying, by the network, a size of the UE policy information, as depicted in step 304.

The method 300 includes splitting, by the network, the UE policy information into a plurality of logical UE policies, as depicted in step 306. The network splits the UE policy, in case the size of the UE policy information exceeds the predefined (e.g., specified) limit. Further, the network verifies the request from the UE and splits the UE policy information based on configuration rules and a split priority.

The split priority can be executed either the PCF or AMF. If the split priority is taken care at AMF, then the AMF splits the UE policy information into the plurality of logical UE policies (with tradeoff where the AMF has to look into the contents. Currently, the AMF is transparently forwarding without peeking into. But such peeking inside will enable efficient splitting). If the split priority is PCF, the AMF sends the UE policy update request to the PCF. Thereafter, the PCF splits the UE policy information into a plurality of logical UE policies.

The method 300 includes sending, by the network, the plurality of logical UE policies in a plurality of policy update messages over a plurality of access channels to the UE to achieve parallelization, as depicted in step 308.

The various actions in method 300 may be performed in the order presented, in a different order or simultaneously. Further, in various embodiments, some actions listed in FIG. 3 may be omitted.

Figure 4:
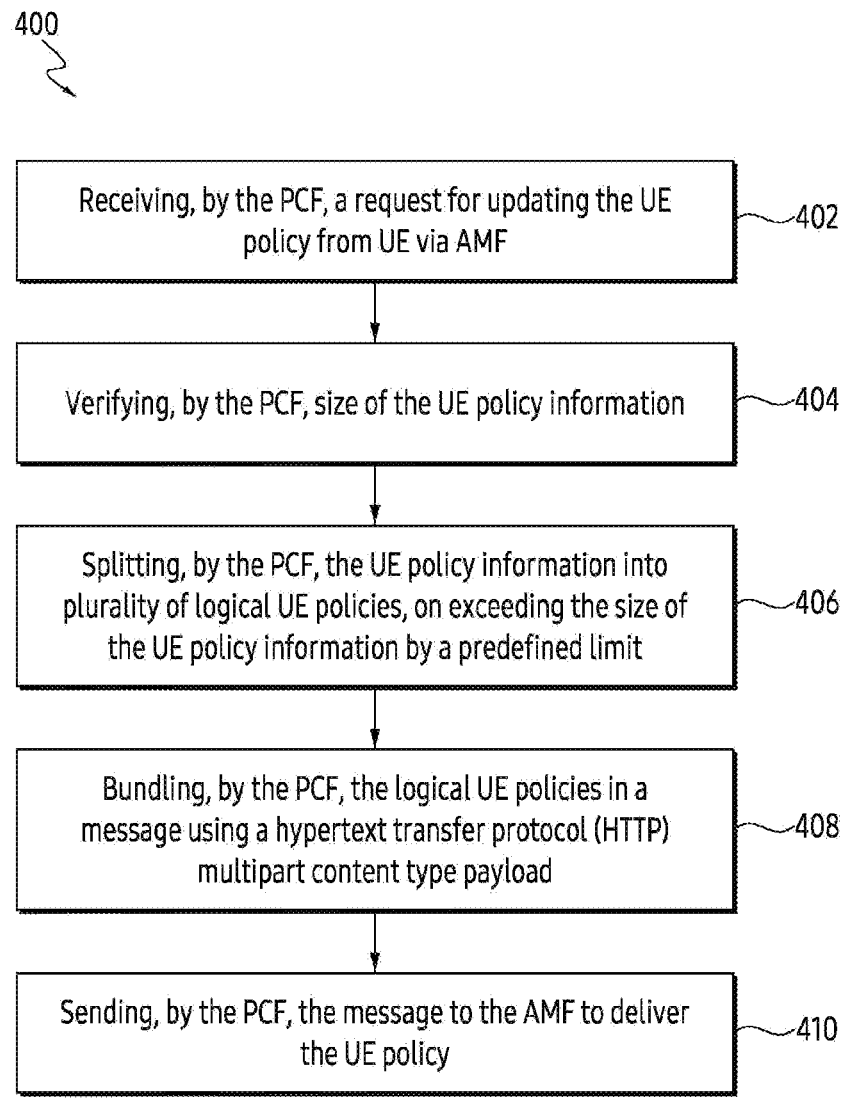
FIG. 4 is a flowchart illustrating an example method for managing UE policy update by the PCF, according to various embodiments.

FIG. 4 is a flowchart illustrating an example method 400 for managing UE policy update by the PCF according to various embodiments. The method 400 includes receiving, by the PCF, a request for updating the UE policy from the UE via the AMF, as depicted in step 402. The method 400 includes verifying, by the PCF, size of the UE policy information, as depicted in step 404. The method 400 includes splitting, by the PCF, the UE policy information into the plurality of logical UE policies, on the size of the UE policy information exceeding by a predefined (e.g., specified) limit, as depicted in step 406.

The method 400 includes bundling, by the PCF, the plurality of logical UE policies in a message using a hyperText transfer protocol (HTTP) multipart content type payload, as depicted in step 408. The method 400 includes sending, by the PCF, the message to the AMF to deliver the UE policies, as depicted in step 410.

The various actions in method 400 may be performed in the order presented, in a different order or simultaneously. Further, in various embodiments, some actions listed in FIG. 4 may be omitted.

Figure 5:
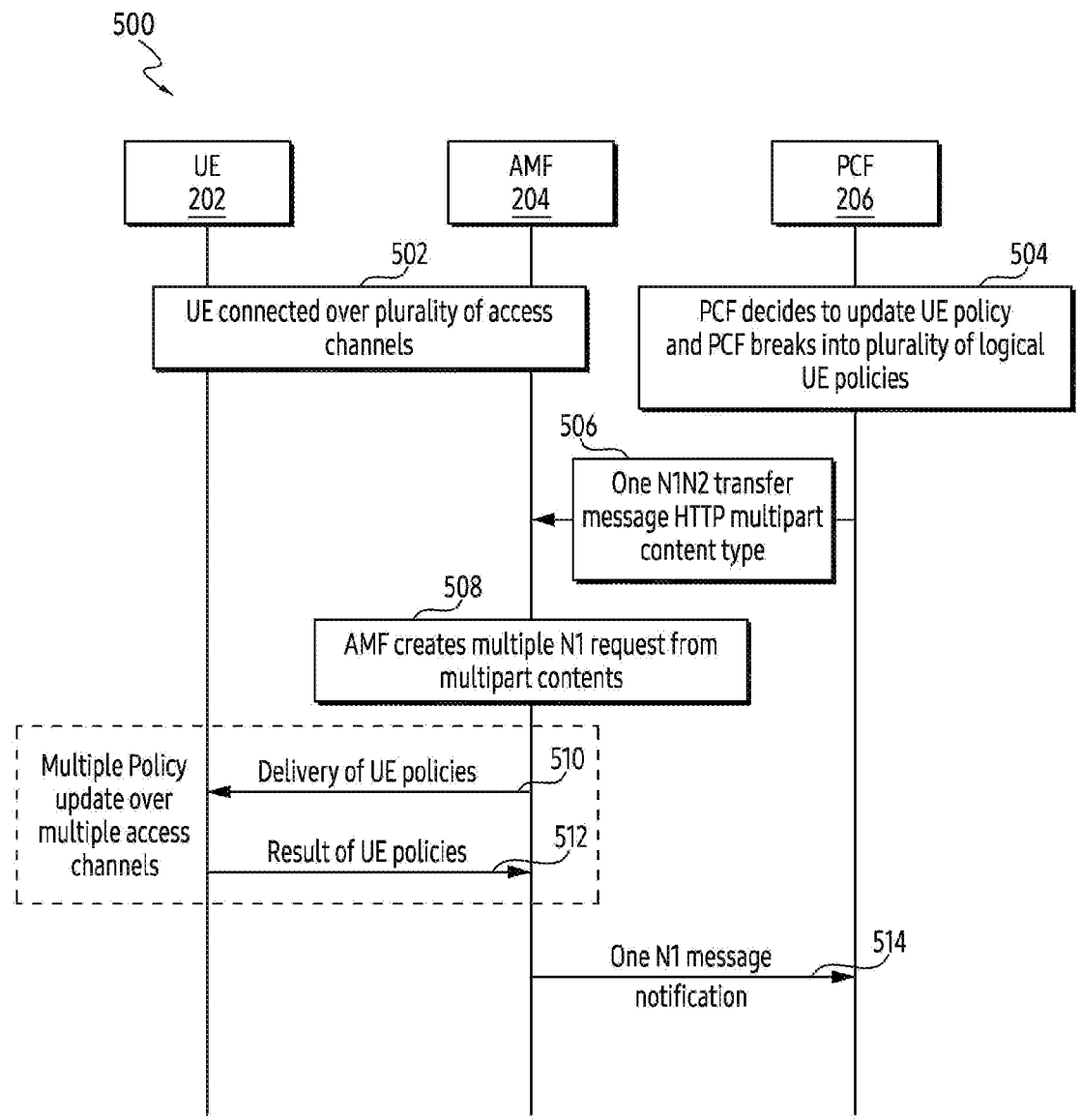
FIG. 5 is a signal flow diagram illustrating example UE policy update management by the network, according to various embodiments.

FIG. 5 is a signal flow diagram 500 illustrating example UE policy update management by the network according to various embodiments. As depicted at step 502, the UE 202 is connected to the network over the plurality of access channels such as 3GPP, non-3GPP etc. Once, the UE 202 sends the UE policy update request to the AMF 204, the AMF 204 sends the update request to the PCF 206. As depicted at step 504, the PCF 206 receives the update request and decides to update the UE policy. The PCF 206 breaks the UE policy into a plurality of logical UE policies based on size of the UE policy to be delivered.

As depicted at step 506, one N1N2 transfer message e.g., Namf_Communication_N1N2MessageTransfer is sent from the PCF 206 to the AMF 204. The PCF 206 bundles the plurality of logical policies into a single HTTP message using the HTTP multipart content type. For example, the one N1N2 transfer message comprises the single HTTP message using the HTTP multipart content type. As depicted at step 508, the AMF 204 receives the HTTP message from the PCF 206 and creates multiple N1 requests from multipart contents present in the message.

As depicted at step 510, the UE policies can be delivered from the AMF 204 to the UE 202 by sending multiple N1 requests over the plurality of access channels through provision of priority indication. The UE 202 receives the requests and updated policies through the plurality of access channels. As depicted at step 512, the updating result of the UE policies are sent to the AMF 204 from the UE 202. As depicted at step 514, one N1 message notification is sent from the AMF 204 to the PCF 206 indicating the UE policy updating by the UE 202.

The various actions in procedure 500 may be performed in the order presented, in a different order or simultaneously. Further, in various embodiments, some actions listed in FIG. 5 may be omitted.

Figure 6:
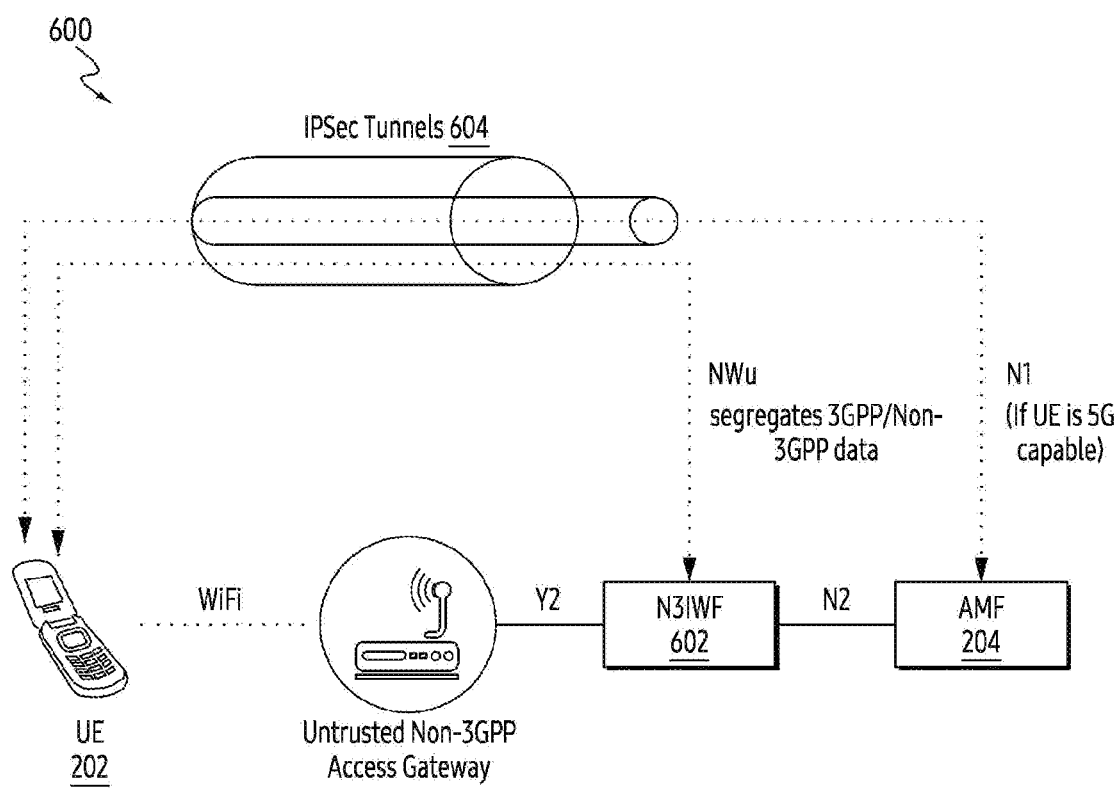
FIG. 6 is a diagram illustrating an example non-trusted 3GPP network communication scenario for implementing a communication between the UE and the AMF, according to various embodiments.

FIG. 6 is a diagram illustrating an example non-trusted 3GPP network communication scenario 600 for implementing a communication between the UE 202 and the AMF 204 according to various embodiments. Non-3GPP Interworking Function (N3IWF) 602 is an enabling node to communicate with an untrusted non-3GPP access, for example, wireline or Wi-Fi. The N3IWF 602 node, acts as a communication gateway between the UE 202 and a 5G Core.

In a non-roaming architecture, the N3IWF 602, 3GPP Control Plane (CP) Network Function (NF), provides Internet Protocol Security (IPSEC) tunnel 604 based secured connection to the UE 202 for accessing the 5G Core. The UE 202 utilizes an N1 interface for NAS signaling to access the 5G Core via non-3GPP access network after proper authentication. The N3IWF 602 NF connects over N2 using Next-Generation Application Protocol (NGAP) and Stream Control Transmission Protocol (SCTP) to the AMF 204 for CP signaling. The NF relays uplink/downlink (UL/DL) NAS N1 signaling messages between the UE 202 and the AMF 204, and forwards the messages transparently from the UE 202 to the AMF 204. Two N1 instances are created, one over gNodeB and another over N3IWF 602 for traffic differentiation. The N1 instance creation procedure can be followed based on 3GPP technical specifications. In roaming scenario, the untrusted non-3GPP access network supports Local Break Out (LBO) as per 3GPP technical specifications.

If the non-3GPP access network is a trusted Wi-Fi access may refer, for example, to the Wi-Fi service being provided by a Mobile Network Operator (MNO). In such case, the Wi-Fi node is also known as a Trusted Non-3GPP Access Point (TNAP). Therefore, the encrypted communication between the AMF 602 and the TNAP can be controlled by an operator.

The various example embodiments disclosed herein can be implemented through at least one software program running on at least one hardware device and performing network management functions to control the network elements. The network elements shown in FIG. 2 include blocks which can be at least one of a hardware device, or a combination of hardware device and software module.

Figure 7:
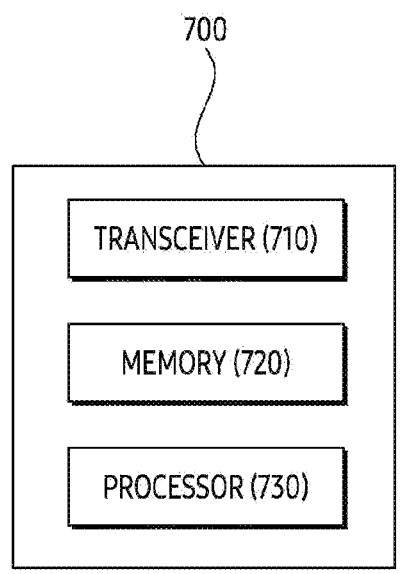
FIG. 7 illustrates a functional configuration of an apparatus acting according to embodiments.

FIG. 7 illustrates a functional configuration of an apparatus acting according to embodiments. The apparatus 700 may be the UE 202, the AMF 204, or the PCF 206 in FIG. 2.

Referring to FIG. 7, the apparatus 700 may include at least one transceiver 710, at least one memory 720, and at least one processor 730.

The transceiver 710 may perform functions for transmitting and receiving signals through a radio channel. For example, the transceiver 710 may perform a converting function between a baseband signal and a bit string according to a physical layer specification of the system. For example, upon data transmission, the transceiver 710 generates complex symbols by encoding and modulating a transmit bit string. For example, upon data reception, the transceiver 710 restores a receive bit string by demodulating and decoding the baseband signal. Further, the transceiver 710 may up-convert the baseband signal into a radio frequency (RF) band signal to transmit the RF band signal through an antenna, and down-convert the RF band signal received through the antenna into the baseband signal.

To this end, the transceiver 710 may include a transmission filter, a reception filter, an amplifier, a mixer, an oscillator, a digital to analog converter (DAC), an analog to digital converter (ADC), and the like. For example, the transceiver 710 may include a plurality of transmission/reception paths. For example, the transceiver 710 may include at least one antenna array having a plurality of antenna elements. In terms of hardware, the transceiver 710 may include a digital unit and an analog unit, wherein the analog unit may include a plurality of sub-units according to operating power, operating frequency, and the like.

The transceiver 710 transmits and receives signals as described above. Accordingly, the transceiver 710 may be referred to as a 'transmitter unit', a 'receiver unit', or a 'transceiver unit'. Further, throughout the following description, transmission and reception performed via a radio channel, a backhaul network, an optical cable, Ethernet, and other wired paths are used to include the meaning that the above-described processing is performed by the transceiver 710. According to an embodiment, the transceiver 710 may provide an interface for communicating with other nodes in the network. In other words, the transceiver 710 may convert a bit string transmitted from the apparatus 700 to another node, such as e.g., another access node, another base station, an upper node, a core network, or the like, into a physical signal, and convert a physical signal received from another node into a bit string.

The memory 720 may store data such as e.g., a basic program, an application program, and setting information for operating the apparatus 700. The memory 720 may store various data used by at least one component (e.g., the transceiver 710 or the processor 730). The data may include, for example, software and input data or output data for an instruction related thereto. The memory 720 may include a volatile memory, a non-volatile memory, or a combination of the volatile memory and the non-volatile memory. Further, the memory 720 may provide data stored therein according to a request of the processor 730.

The processor 730 may control the overall operations of the apparatus 700. For example, the processor 730 records or reads data in the memory 720. For example, the processor 730 transmits and receives a signal through the transceiver 710. Although FIG. 7 illustrates one processor, embodiments of the disclosure are not limited thereto. The apparatus 700 may include at least one processor to perform example embodiments. The processor 730 may be referred to as a control unit or a control means, and may include a processing circuitry. According to embodiments, the processor 730 may control the apparatus 700 to perform at least one of operations or methods according to example embodiments.

Although only a single element (e.g., transceiver 710, memory 720, processor 730) is shown in the drawings, it is not excluded that the apparatus 700 according to embodiments of the present disclosure may include a plurality of elements. For example, the apparatus 700 may include a plurality of transceivers. The apparatus 700 may include a plurality of memories. The apparatus 700 may include a plurality of processors.

According to embodiments, a method for managing User Equipment (UE) policy update by a network, comprises receiving, by the network, a request for updating the UE policy from a UE. The method comprises verifying, by the network, a size of the UE policy information. The method comprises splitting, by the network, the UE policy information into a plurality of logical UE policies, based on a size of the UE policy information exceeding a specified limit. The method comprises sending, by the network, the plurality of logical UE policies in a plurality of policy update messages over a plurality of access channels to the UE in parallel.

In an embodiment, the method further comprises receiving, by a Policy Control Function (PCF) of the network, the request for updating the UE policy from the UE via an Access and Mobility Management Function (AMF).

In an embodiment, the method further comprises verifying, by the PCF of the network, the size of the UE policy information.

In an embodiment, the method further comprises splitting, by the PCF or the AMF of the network, the UE policy information into the plurality of logical UE policies based on configuration rules and a split priority. The configuration rules are governed either by the UE or the network.

In an embodiment, the method further comprises bundling, by the PCF of the network, the plurality of logical UE policies in a message using a hyperText transfer protocol (HTTP) multipart content type payload and sending the message to the AMF.

In an embodiment, the method further comprises breaking, by the AMF of the network, the plurality of logical UE policies into the plurality of policy update messages.

In an embodiment, the method further comprises sending the plurality of logical UE policies, by the AMF of the network, in the plurality of policy update messages over a 3GPP access channel and a non-3GPP access channel to the UE.

In an embodiment, the method further comprises providing, by the AMF of the network, a priority access definition to use a specific access channel to deliver the plurality of policy update messages.

In an embodiment, the method further comprises receiving, by the PCF, a single failure message from the AMF instead of a plurality of failure messages, based on a message delivery failure to the UE.

According to embodiments, a network is configured to receive a request for updating a user equipment (UE) policy from a UE. The network is configured to verify a size of the UE policy information. The network is configured to split the UE policy information into a plurality of logical UE policies, based on the size of the UE policy information exceeding a specified limit. The network is configured to send the plurality of logical UE policies in a plurality of policy update messages over a plurality of access channels to the UE in parallel.

According to embodiments, a method for managing User Equipment (UE) policy update, comprises sending, by a UE, a request for updating the UE policy to a network. The method comprises receiving, by the UE, a plurality of logical UE policies in a plurality of policy update messages over a plurality of access channels, based on a size of the UE policy information exceeding a specified limit.

In an embodiment, the method further comprises receiving, by a Policy Control Function (PCF) of the network, the request for updating the UE policy from the UE via an Access and Mobility Management Function (AMF).

In an embodiment, the method further comprises verifying, by the PCF of the network, the size of the UE policy information.

In an embodiment, the method further comprises splitting, by the PCF or the AMF of the network, the UE policy information into the plurality of logical UE policies based on configuration rules and a split priority. The configuration rules are governed either by the UE or the network.

In an embodiment, the method further comprises bundling, by the PCF of the network, the plurality of logical UE policies in a message using a hyperText transfer protocol (HTTP) multipart content type payload, and sending the message to the AMF.

In an embodiment, the method further comprises breaking, by the AMF of the network, the plurality of logical UE policies into the plurality of policy update messages.

In an embodiment, the method further comprises sending, by the AMF of the network, the plurality of logical UE policies in the plurality of policy update messages over the plurality of access channels to the UE in parallel.

In an embodiment, the method further comprises sending, by the AMF of the network, the plurality of logical UE policies in the plurality of policy update messages over a 3GPP and a non-3GPP access channel to the UE.

In an embodiment, the method further comprises providing, by the AMF of the network, a priority access definition to use a specific access channel to deliver the plurality of policy update messages.

In an embodiment, the method further comprises receiving, by the PCF of the network, a single failure message from the AMF instead of a plurality of failure messages, based on a message delivery failure to the UE.

According to embodiments, a User Equipment (UE) is configured to send a request for updating the UE policy to a network. The UE is configured to receive a plurality of logical UE policies in a plurality of policy update messages over a plurality of access channels, based on a size of the UE policy information exceeding a specified limit.

According to embodiments, a method for managing User Equipment (UE) policy update by a Policy Control Function (PCF), comprises receiving, by the PCF, a request for updating the UE policy from the UE via an Access and Mobility Management Function (AMF). The method comprises verifying, by the PCF, a size of the UE policy information. The method comprises splitting, by the PCF, the UE policy information into a plurality of logical UE policies, based on the size of the UE policy information exceeding a specified limit. The method comprises bundling, by the PCF, the plurality of logical UE policies in a message using a hyperText transfer protocol (HTTP) multipart content type payload. The method comprises sending, by the PCF, the message to the AMF.

According to embodiments, a method performed by an access and mobility management function (AMF), comprises transmitting, to a policy control function (PCF), a request for updating a user equipment (UE) policy transmitted from a UE. The method comprises receiving, from the PCF, a message bundled a plurality of logical UE policies based on the UE policy. The method comprises generating a plurality of N1 requests based on the message. The method comprises transmitting, to the UE, the plurality of N1 requests to delivery of the UE policy.

In an embodiment, the method comprises receiving, from the UE, the request for updating the UE policy. The method comprises receiving, from the UE, a result of the UE policy in response to the plurality of N1 requests.

In an embodiment, the method comprises transmitting, to the PCF, a N1 message notification, wherein the N1 message notification indicates a failure of the delivery of the UE policy associated with the plurality of the logical UE policies.

In an embodiment, the method comprises breaking the plurality of logical UE policies into the plurality of N1 requests for updating the UE policy. The plurality of N1 requests are transmitted over a plurality of access channels.

In an embodiment, one of the plurality of access channels is identified based on a priority indication to transmit the plurality of N1 requests.

In an embodiment, the plurality of logical UE policies is split from UE policy information for the UE policy in case that the size of the UE policy information exceeds a specified limit.

In an embodiment, the message bundled the plurality of logical UE policies comprises a hyperText transfer protocol (HTTP) message using a HTTP multipart content type payload. The HTTP message includes a HTTP header used to pack the plurality of logical UE policies in a single message. The HTTP header value corresponds to multipart/multiple-policies.

According to embodiments, an access and mobility management function (AMF), comprises a transceiver. The AMF comprises a processor. The processor is configured to transmit, to a policy control function (PCF), a request for updating a user equipment (UE) policy transmitted from a UE. The processor is configured to receive, from the PCF, a message bundled a plurality of logical UE policies based on the UE policy. The processor is configured to generate a plurality of N1 requests based on the message. The processor is configured to transmit, to the UE, the plurality of N1 requests to delivery of the UE policy.

According to embodiments, a non-transitory computer-readable medium is provisioned with program instructions that, when executed by one or more processors, cause an access and mobility management function (AMF) to perform functions comprises transmitting, to a policy control function (PCF), a request for updating a user equipment (UE) policy transmitted from a UE. The non-transitory computer-readable medium is provisioned with program instructions that, when executed by one or more processors, cause the AMF to perform functions comprises receiving, from the PCF, a message bundled a plurality of logical UE policies based on the UE policy. The non-transitory computer-readable medium is provisioned with program instructions that, when executed by one or more processors, cause the AMF to perform functions comprises generating a plurality of N1 requests based on the message. The non-transitory computer-readable medium is provisioned with program instructions that, when executed by one or more processors, cause the AMF to perform functions comprises transmitting, to the UE, the plurality of N1 requests to delivery of the UE policy.

According to embodiments, a method performed by a policy control function (PCF), comprises receiving, from an access and mobility function (AMF), a request for updating a user equipment (UE) policy transmitted from a UE. The method comprises transmitting, to the PCF, a message bundled a plurality of logical UE policies based on the UE policy. A plurality of N1 requests are generated based on the message. The plurality of N1 requests are transmitted to the UE to delivery of the UE policy.

In an embodiment, a result of the UE policy is transmitted in response to the plurality of N1 requests.

In an embodiment, the method comprises receiving, from the AMF, a N1 message notification based on the result of the UE policy, wherein the N1 message notification indicates a failure of the delivery of the UE policy associated with the plurality of the logical UE policies.

In an embodiment, the plurality of logical UE policies is broken into the plurality of N1 requests for updating the UE policy. The plurality of N1 requests are transmitted over a plurality of access channels.

In an embodiment, one of the plurality of access channels is identified based on a priority indication to transmit the plurality of N1 requests.

In an embodiment, the method comprises splitting UE policy information for the UE policy into the plurality of logical UE policies in case that the size of the UE policy information exceeds a specified limit.

In an embodiment, the message bundled the plurality of logical UE policies comprises a hyperText transfer protocol (HTTP) message using a HTTP multipart content type payload. The HTTP message includes a HTTP header used to pack the plurality of logical UE policies in a single message. The HTTP header value corresponds to multipart/multiple-policies.

According to embodiments, a policy control function (PCF) comprises a transceiver. The PCF comprises a processor. The processor is configured to receive, from an access and mobility function (AMF), a request for updating a user equipment (UE) policy transmitted from a UE. The processor is configured to transmit, to the PCF, a message bundled a plurality of logical UE policies based on the UE policy. A plurality of N1 requests are generated based on the message. The plurality of N1 requests are transmitted to the UE to delivery of the UE policy.

According to embodiments, a non-transitory computer-readable medium is provisioned with program instructions that, when executed by one or more processors, cause a policy control function (PCF) to perform functions comprises receiving, from an access and mobility function (AMF), a request for updating a user equipment (UE) policy transmitted from a UE. The non-transitory computer-readable medium is provisioned with program instructions that, when executed by one or more processors, cause the PCF to perform functions comprises transmitting, to the PCF, a message bundled a plurality of logical UE policies based on the UE policy. A plurality of N1 requests are generated based on the message. The plurality of N1 requests are transmitted to the UE to delivery of the UE policy.

According to embodiments, a method performed by a user equipment (UE), comprises transmitting, to an access and mobility management function (AMF), a request for updating a user equipment (UE) policy. The request is forwarded from the AMF to a policy control function (PCF). The method comprises receiving, from the AMF, a plurality of N1 requests to delivery of the UE policy. The plurality of N1 requests are generated based on a message. The message is bundled from a plurality of logical UE policies based on the UE policy.

In an embodiment, the method comprises transmitting, to the AMF, a result of the UE policy in response to the plurality of N1 requests.

In an embodiment, a N1 message notification is transmitted from the AMF to the PCF based on the result of the UE policy. The N1 message notification indicates a failure of the delivery of the UE policy associated with the plurality of the logical UE policies.

In an embodiment, the plurality of logical UE policies is broken into the plurality of N1 requests for updating the UE policy. The plurality of N1 requests are transmitted over a plurality of access channels.

In an embodiment, the plurality of logical UE policies is split from UE policy information for the UE policy in case that the size of the UE policy information exceeds a specified limit.

In an embodiment, the message bundled the plurality of logical UE policies comprises a hyperText transfer protocol (HTTP) message using a HTTP multipart content type payload. The HTTP message includes a HTTP header used to pack the plurality of logical UE policies in a single message. The HTTP header value corresponds to multipart/multiple-policies.

According to embodiments, a user equipment (UE) comprises a transceiver. The UE comprises a processor. The processor is configured to transmit, to an access and mobility management function (AMF), a request for updating a user equipment (UE) policy. The request is forwarded from the AMF to a policy control function (PCF). The processor is configured to receive, from the AMF, a plurality of N1 requests to delivery of the UE policy. The plurality of N1 requests are generated based on a message. The message is bundled from a plurality of logical UE policies based on the UE policy.

According to embodiments, a non-transitory computer-readable medium is provisioned with program instructions that, when executed by one or more processors, cause a user equipment (UE) to perform functions comprises transmitting, to an access and mobility management function (AMF), a request for updating a user equipment (UE) policy. The request is forwarded from the AMF to a policy control function (PCF). The non-transitory computer-readable medium is provisioned with program instructions that, when executed by one or more processors, cause a user equipment (UE) to perform functions comprises receiving, from the AMF, a plurality of N1 requests to delivery of the UE policy. The plurality of N1 requests are generated based on a message. The message is bundled from a plurality of logical UE policies based on the UE policy.

The disclosed system can be implemented 5G ATSSS (Access Steering, Switching and Splitting) feature to showcase reduced latency and better user perceived experience. The system can be applied to presence and other rich multimedia signaling communication.

The various example embodiments disclosed herein describe a system and method for transmitting the logically separated UE policies in a single message from the PCF to the AMF. The AMF further breaks the message into a plurality of policy update messages and transmits the messages with UE policies to the UE over multiple access channels. Therefore, it will be understood that the scope of the disclosure extends to such a program and in addition to a computer readable medium having a message therein, such computer readable storage medium may contain program code for implementation of one or more steps of the method, when the program runs on a server or mobile device or any suitable programmable device. The method is implemented in various embodiments through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include various components which could be e.g. hardware like e.g. an ASIC, or a combination of hardware and software, e.g. an ASIC and an FPGA, or at least one microprocessor and at least one memory with software modules located therein. The various example method embodiments described herein could be implemented partly in hardware and partly in software. The disclosure may be implemented on different hardware devices, e.g. using a plurality of CPUs.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by an access and mobility management function (AMF) for updating a user equipment (UE) policy, comprising:
   receiving, from a policy control function (PCF), a message including a hypertext transfer protocol (HTTP) header indicating a multipart content type and a HTTP payload bundled with a plurality of logical UE policies;
   generating a plurality of N1 requests based on the message; and
   transmitting, to a UE, the plurality of N1 requests to deliver the UE policy,
   wherein a total size of the plurality of logical UE policies exceeds a predefined size allowed in a packet data convergence protocol (PDCP) layer.

2. The method of claim 1, further comprising:
   receiving, from the UE, a result of the UE policy in response to the plurality of N1 requests.

3. The method of claim 2, further comprising:
   transmitting, to the PCF, a N1 message notification, wherein the N1 message notification indicates a failure of the delivery of the UE policy associated with the plurality of the logical UE policies.

4. The method of claim 1, further comprising:
   dividing the plurality of logical UE policies into the plurality of N1 requests for updating the UE policy,
   wherein the plurality of N1 requests are transmitted over a plurality of access channels.

5. The method of claim 4,
   wherein one of the plurality of access channels is identified based on a priority indication to transmit the plurality of N1 requests.

6. The method of claim 1, wherein the plurality of logical UE policies are split from UE policy information for the UE policy in case that the size of the UE policy information exceeds the predefined size.

7. The method of claim 1,
   wherein the HTTP header is used to pack the plurality of logical UE policies in a single message.

8. A method performed by a policy control function (PCF) for updating a user equipment (UE) policy, comprising:
   determining to update the UE policy;
   determining whether a size of the UE policy exceeds a predefined size allowed in a packet data convergence protocol (PDCP) layer;
   in accordance with a determination that the size of the UE policy exceeds the predefined size, identifying a plurality of logical UE policies from the UE policy;
   transmitting, to an access and mobility management function (AMF), a message including a hypertext transfer protocol (HTTP) header indicating a multipart content type and a HTTP payload bundled with the plurality of logical UE policies,
   wherein a plurality of N1 requests are generated based on the message, and
   wherein the plurality of N1 requests are transmitted to the UE to deliver the UE policy.

9. The method of claim 8, wherein a result of the UE policy is transmitted in response to the plurality of N1 requests.

10. The method of claim 9, further comprising:
    receiving, from the AMF, a N1 message notification based on the result of the UE policy, wherein the N1 message notification indicates a failure of the delivery of the UE policy associated with the plurality of the logical UE policies.

11. The method of claim 8,
    wherein the plurality of logical UE policies is divided into the plurality of N1 requests for updating the UE policy,
    wherein the plurality of N1 requests are transmitted over a plurality of access channels.

12. The method of claim 11,
    wherein one of the plurality of access channels is identified based on a priority indication to transmit the plurality of N1 requests.

13. The method of claim 8, wherein identifying the plurality of logical UE policies comprises:
    splitting UE policy information for the UE policy into the plurality of logical UE policies in case that the size of the UE policy information exceeds the predefined size.

14. The method of claim 8,
    wherein the HTTP header is used to pack the plurality of logical UE policies in a single message.

15. A method performed by a user equipment (UE) for updating a UE policy, comprising:
    receiving, from an access and mobility management function (AMF), a plurality of N1 requests to deliver the UE policy; and,
    transmitting, to the AMF, a result of the UE policy in response to the plurality of N1 requests,
    wherein the plurality of N1 requests are generated based on a message,
    wherein the message includes a hypertext transfer protocol (HTTP) header indicating a multipart content type and a HTTP payload bundled with a plurality of logical UE policies, and
    wherein a total size of the plurality of logical UE policies exceeds a predefined size allowed in a packet data convergence protocol (PDCP) layer.

16. The method of claim 15,
    wherein a N1 message notification is transmitted from the AMF to the PCF based on the result of the UE policy, and
    wherein the N1 message notification indicates a failure of the delivery of the UE policy associated with the plurality of the logical UE policies.

17. The method of claim 15,
    wherein the plurality of logical UE policies is divided into the plurality of N1 requests for updating the UE policy,
    wherein the plurality of N1 requests are transmitted over a plurality of access channels.

18. The method of claim 15, wherein the plurality of logical UE policies is split from UE policy information for the UE policy exceeds the predefined size.

19. The method of claim 15,
    wherein the HTTP header is used to pack the plurality of logical UE policies in a single message.

* * * * *